United States Patent
Lorenz et al.

(10) Patent No.: US 9,000,611 B2
(45) Date of Patent: ***Apr. 7, 2015

(54) PROTECTION TECHNIQUES FOR AN ELECTRIC POWER SYSTEM

(75) Inventors: Rick A. Lorenz, Ham Lake, MN (US); J. Bruce Schelkopf, Zionsville, IN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 1024 days.
This patent is subject to a terminal disclaimer.

(21) Appl. No.: 12/386,566

(22) Filed: Apr. 20, 2009

(65) Prior Publication Data

US 2010/0010684 A1    Jan. 14, 2010

Related U.S. Application Data

(63) Continuation-in-part of application No. 11/800,749, filed on May 7, 2007, now Pat. No. 7,521,822.

(51) Int. Cl.
*H02J 9/00* (2006.01)
*H02H 7/06* (2006.01)
*H02J 7/00* (2006.01)
*H02J 9/06* (2006.01)

(52) U.S. Cl.
CPC ............... *H02H 7/06* (2013.01); *H02J 7/0031* (2013.01); *H02J 9/06* (2013.01)

(58) Field of Classification Search
CPC ....... H02H 7/06; H02H 7/065; H02H 7/0031; H02J 9/06; H02J 9/061; H02J 9/066
USPC ........ 307/64–66, 125, 131, 326, 153; 361/20, 361/21
See application file for complete search history.

(56) References Cited

U.S. PATENT DOCUMENTS

| | | | |
|---|---|---|---|
| 3,636,368 A | | 1/1972 | Sia |
| 3,879,639 A | * | 4/1975 | Sircom ........................... 361/45 |
| 4,208,693 A | | 6/1980 | Dickens et al. |
| 4,245,182 A | | 1/1981 | Aotsu et al. |
| 4,262,212 A | * | 4/1981 | Jacob et al. .................... 307/9.1 |

(Continued)

OTHER PUBLICATIONS

Department of the Army, Coordinated Power Systems Protection, Technical Manual TM 5-811-14 [on-line], Feb. 1991 URL:<http://www.usace.army.mil/publications/armytm/tm5-811-14/>.

(Continued)

*Primary Examiner* — Fritz M Fleming
(74) *Attorney, Agent, or Firm* — Krieg DeVault LLP

(57) ABSTRACT

One embodiment of the present application is directed to a protection technique for an electric power generation system. In one or more implementations, an electric power generator, generator control circuitry, electrical output sensors to provide one or more corresponding signals, electrical switching equipment to selectively couple the generator to an electrical load, and electric power feeder or branch circuit conductors, to route electric power from the generator to the switching equipment, are provided. The control circuitry is responsive to the sensor signals to determine if a shutdown condition exists as a function of a protection profile determined for the system. This profile may account for damage thresholds of the generator, the feeder or branch circuit conductors, the electrical switching equipment for each of a number of different combinations of level and duration of electrical output as represented by the sensor signals.

41 Claims, 8 Drawing Sheets

(56) References Cited

U.S. PATENT DOCUMENTS

| | | | |
|---|---|---|---|
| 4,384,213 A | 5/1983 | Bogel | |
| 4,443,828 A | 4/1984 | Legrand et al. | |
| 4,589,052 A | 5/1986 | Dougherty | |
| 4,855,664 A | 8/1989 | Lane | |
| 4,912,382 A | 3/1990 | Koenig et al. | |
| 4,996,646 A | 2/1991 | Farrington | |
| 5,006,781 A | 4/1991 | Schultz et al. | |
| 5,117,174 A | 5/1992 | Kessler | |
| 5,168,208 A | 12/1992 | Schultz et al. | |
| 5,332,927 A * | 7/1994 | Paul et al. | 307/66 |
| 5,390,068 A | 2/1995 | Schultz et al. | |
| 5,592,393 A | 1/1997 | Yalla | |
| 5,642,002 A | 6/1997 | Mekanik et al. | |
| 5,701,070 A * | 12/1997 | Schultz | 322/37 |
| 6,172,428 B1 | 1/2001 | Jordan | |
| 6,175,166 B1 | 1/2001 | Bapat | |
| 6,563,234 B2 | 5/2003 | Hasegawa et al. | |
| 6,701,221 B1 | 3/2004 | Eaton et al. | |
| 6,791,208 B2 * | 9/2004 | Pfeiffer | 307/64 |
| 7,060,379 B2 | 6/2006 | Speranza et al. | |
| 7,104,847 B2 * | 9/2006 | Sodemann et al. | 439/638 |
| 7,382,063 B2 | 6/2008 | Mullet et al. | |
| 7,521,822 B2 * | 4/2009 | Lorenz | 307/64 |
| 2004/0169421 A1 * | 9/2004 | Eaton et al. | 307/64 |
| 2004/0262997 A1 | 12/2004 | Gull et al. | |

OTHER PUBLICATIONS

Eaton, O & M, Manual for the ATC-400 Controlled Transfer Switch [online], Jun. 2003, URL: <http://www.eaton.com/ecm/idcplg?IdcService=GET_FILE&dID=3587>.

* cited by examiner

PROTECTION TECHNIQUES FOR AN ELECTRIC POWER SYSTEM

CROSS-REFERENCE TO RELATED APPLICATIONS

The present application is a continuation-in-part of U.S. patent application Ser. No. 11/800,749, filed on May 7, 2007 now U.S. Pat. No. 7,521,822, which is hereby incorporated by reference in its entirety.

BACKGROUND

The present application relates to electrical power generation and electrical power distribution, and more particularly, but not exclusively to fault protection and predictive protection techniques associated with electric power systems.

Typically, circuit breakers are the primary protective device utilized for electric power generator systems. In the event of a fault condition, such as excessive electrical current, the circuit breaker is opened. A given circuit breaker may be packaged with fault detection capability and/or depend on external inputs to indicate a fault has been detected. Under certain circumstances, circuit breakers may improperly open in response to transient conditions resulting in a false trip; and under other circumstances, there may be an attendant delay in opening the circuit breaker resulting in damage to a generator, feeder or branch circuit conductors, transfer switch, transformers, utilization equipment, or other equipment of the power system.

Thus, there remains a need for further contributions in this area of technology.

SUMMARY

One embodiment of the present invention is a unique electric power system protection technique. Other embodiments include unique methods, systems, devices, and apparatus involving an electric power supply. Further embodiments, forms, objects, aspects, benefits, and advantages of the present invention shall become apparent from the figures and description provided herewith.

DETAILED DESCRIPTION OF REPRESENTATIVE EMBODIMENTS

Figure 1:
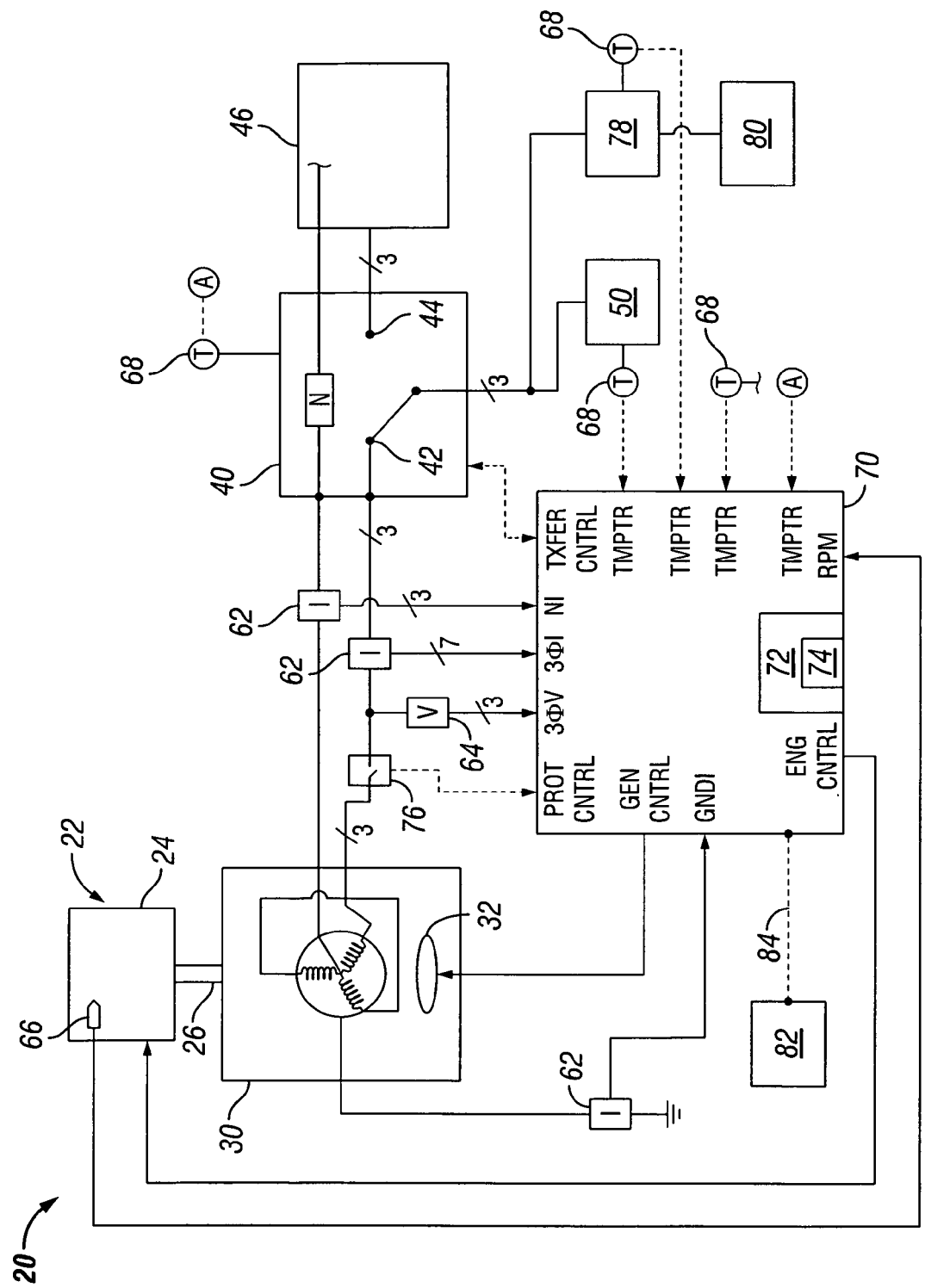
FIG. 1 is a diagrammatic view of an electrical power system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present application includes an electrical power system with a generator, a transfer switch, feeder or branch circuit conductors coupling the generator and the transfer switch, utilization equipment and electrical loads. Also included is control circuitry that monitors electric output of the generator and halts generator operation if an undesirable condition is detected in this output. Also included in an embodiment is generator control circuitry that contains programmable memory that recognizes the thermal, voltage, harmonic distortion, ground fault and/or other electrical characteristic damage curves of a generator, feeder or branch circuit conductors, transfer switch, utilization equipment, and/or electrical loads. The generator control circuitry can predict, from the rate of change, absolute values, and/or duration of electric output values from the generator, based on operational characteristics and halts the generator operation if an undesirable condition is predicted to occur before the undesirable condition actually occurs in the generator output. It will be appreciated by those of skill in the art that the generator in the electrical power system may be or operate as any of a primary or back-up generator without limitation.

Examples of such an undesirable condition include, without limitation, an overvoltage, an undervoltage, a ground fault, undesired electric current flow in a neutral line, a temperature, an output harmonic distortion, a frequency deviation, and an overcurrent. Furthermore, the undesirable condition may be predictively determined as a function of a level (magnitude) and duration of one or more given characteristics such as voltage, current, temperature, etc., or a rate of change of one or more of the given characteristics while being monitored for the electric power system. In one particular, nonlimiting form, the undesirable condition is determined from a thermal damage curve determined in terms of time versus electric current level and the generator is configured to provide back-up power relative to a primary source (i.e., power source), such as a utility power source (e.g. a public power utility grid). In another particular, nonlimiting form, the undesirable condition is determined from a predictive thermal damage curve determined in terms of time versus electric current level given characteristics such as voltage, current, temperature, etc., being monitored for the electrical power system, and the generator is configured to provide back-up power relative to a primary source, such as a utility power source.

FIG. 1 depicts electrical power system 20 of a further embodiment of the present application. Electrical power system 20 includes a back-up electric power generation subsystem 22. Subsystem 22 includes a prime mover in the form of an internal combustion engine 24 and an alternator or electric power generator 30 to provide a three-phase, Alternating Current (AC), voltage at a target magnitude and frequency. Engine 24 provides rotational mechanical power to generator 30 with rotary drive mechanism 26. Mechanism 26 can be a direct drive member, a device that provides a non-unity turn ratio, a torque converter, a transmission, and/or a different form of rotary linkage as would occur to those skilled in the art. In one arrangement, engine 24 is of a reciprocating piston type that is diesel fueled. In other forms, engine 24, mechanism 26, and/or generator 30 can be of other types; engine 24 may be alternatively fueled; and/or a different form of prime mover can be used to provide mechanical power to generator 30 as an alternative or addition to engine 24. Such different forms of prime mover include, without limitation, a wind turbine, a hydraulic turbine, and/or a steam turbine.

Generator 30 includes excitation field windings 32 operatively coupled to generator control circuitry (circuitry) 70 to be further described hereinafter. The electric power output of generator 30 is coupled by feeder conductors 34 to transfer switch 40. In one aspect, preferably, the electric power output of generator 30 is three-phased, though any embodiment herein is not so limited. A neutral conductor "N" also interconnects generator 30 and switch 40. An electrical earth ground "GND" for generator 30 is also illustrated. Switch 40 includes contacts 42 in electrical continuity with conductors 34 and contacts 44 electrically coupled to public utility power source 46. In one aspect, preferably, the contacts 42, 44 are associated with the phase of the electric power output of generator 30 such that for a three-phase power output of generator 30, there are three contacts 42 in electrical continuity with conductors 34 and three contacts 44 electrically coupled to power source 46, which in certain embodiments is a public utility power source 46.

Switch 40 is also connected to electrical load 50, and is structured to electrically couple contacts 42 to load 50 or contacts 44 to load 50 to alternatively provide power from subsystem 22 or power source 46. Utilization equipment 78 is also connected to the switch 40 via the contacts 42. Certain embodiments include the load 50, utilization equipment 78, or both. The utilization equipment 78 is an uninterruptible power supply (UPS) for an electrical device 80, although the utilization equipment 78 may be a variable frequency drive or any other electrical device having a power input. In certain embodiments, the utilization equipment 78 includes any electrical device having a sensitivity to a disturbance in input frequency, voltage, current, and/or other electrical parameters.

Accordingly, in one embodiment, a three-phase switch 40 operates as a triple pole, double throw type. Switch 40 can be of a standard type used in various power switching applications, such as emergency power generation systems, stand-by power generation systems, or other types of back-up power sources, as well as other applications that do not necessarily require back-up power sourcing which would be known to those skilled in the art.

Electrical power system 20 further includes voltage sensors 64 to monitor magnitude of voltage output by generator 30 on conductors 34. Sensors 64 may be in the form of circuitry that samples a voltage drop across a known resistance or the like. Electrical power system 20 further includes current sensors 62 that monitor magnitude of electric current flow through conductors 34, neutral (N), and ground (GND), in association with generator 30. Sensors 62 may be of a standard current transformer type or such other variety as would be known to those skilled in the art. Sensor 66 is of a standard type that provides a sensor signal representing rotational speed of engine 24. In some forms, the sensor signal of sensor 66 is representative of the frequency of the electric power output of generator 30; however, frequency of the electric power output can be determined using other techniques. Sensors 68 monitor temperatures of any component in the system 20, or of the ambient environment. Sensors 62, 64, 66, and 68 are converted to a digital form for processing using standard techniques. Alternatively or additionally, in other embodiments, an analog form of sensor signal processing may be used.

In certain embodiments, a sensor 62, 64, 66, 68 provides a sensor signal representing an information input such as a network communication from a "smart" component, for example an engine speed may be provided to the circuitry 70 from an engine controller (not shown). In certain embodiments, a sensor 62, 64, 66, 68 signal represents a virtual sensor including a parameter value determined based on other parameter values; for example a temperature of a component may be estimated according to a voltage and current at the component, combined with a heat dissipation model of the component.

System 20 includes a protective device 76 between the generator 30 and the transfer switch 40. The protective device 76 includes a first state providing electrical continuity between the generator 30 and the transfer switch 40, and a second state providing an electrical discontinuity between the generator 30 and the transfer switch 40. The protective device 76 is responsive to signals from the circuitry 70 or to hard-wired inputs. The protective device 76 may be a switch, a solenoid device, a field effect transistor, or other electrical continuity switching device known in the art.

Electrical power system 20 further includes circuitry 70 that may be provided with generator 30 as part of the power generation subsystem 22. In one particular form, engine 24, generator 30, and circuitry 70 are provided as an integral generator set (i.e., "genset") subsystem. Circuitry 70 includes inputs from current sensors 62 corresponding to the three phases of the electrical output of generator 30 designated as "3ϕI," any detected neutral current designated as "NI," and any detected electric earth ground current designated as "GNDI." Sensors 64 provide voltages corresponding to the three-phase electric output of generator 24 designated as "3ϕV." The engine speed input from sensor 66 is designated as "RPM." Operation of engine 24 may be regulated via the engine controller that is in turn responsive to control signals from circuitry 70 of electrical power system 20. Alternatively, some or all of the control of engine 24 may be included in circuitry 70 in lieu of a separate engine controller.

Circuitry 70 includes controller 72 with memory 74. Controller 72 executes operating logic that defines various control, management, and/or regulation functions. This operating logic may be in the form of dedicated hardware, such as a hardwired state machine, programming instructions, and/or a different form as would occur to those skilled in the art. Circuitry 70 and/or controller 72 may be provided as a single component or a collection of operatively coupled components; and may be comprised of digital circuitry, analog circuitry, software, or a hybrid combination of any of these types. Controller 72 can include multiple processing units arranged to operate independently, in a pipeline processing arrangement, in a parallel processing arrangement, and/or such different arrangement as would occur to those skilled in the art. When controller 72 is of a multi-component form, it may have one or more components remotely located relative to the others. In one embodiment, controller 72 is a programmable microprocessing device of a solid-state, integrated circuit type that includes one or more processing units and memory. In one form, controller 72 can include a computer network interface to facilitate communications using one or more standard communication protocols. Such an interface may be used to report system status information, receive sensor/detector inputs, operator input/output, communicate other data used in its operation, perform remote debugging or monitoring of circuitry 70, and/or to receive operating logic updates in the form of programming instructions or the like. It should be appreciated that one or more operator input controls, such as a keyboard, pointer, switches, or the like; and one or more operator outputs, such as a display, alarm, indicator, or the like can be included in subsystem 22 with appropriate interfacing to circuitry 70.

Memory 74 may be comprised of one or more types including but not limited to semiconductor, magnetic, and/or optical varieties, and/or may be of a volatile and/or nonvolatile variety. In one form, memory 74 stores programming instructions executed by controller 72 of circuitry 70 to embody at least a portion of its operating logic. Alternatively or additionally, memory 74 stores data that is manipulated by the operating logic of controller 72. Circuitry 70 may include signal conditioners, modulators, demodulators, Arithmetic Logic Units (ALUs), Central Processing Units (CPUs), oscillators, control clocks, amplifiers, communication ports, delay devices, signal format converters (such as analog-to-digital and digital-to-analog converters), limiters, clamps, filters, power supplies, and the like as needed to perform various control, management, and regulation operations described in the present application.

In operation, circuitry 70 controls a number of aspects of subsystem 22, such as electronic governor control, automatic voltage regulation, regulated short circuit current, engine speed sensing, engine fault monitor, overload/overcurrent fault, neutral current fault, earth ground fault, short circuit fault, automatic synchronization with other AC power sources, permissive paralleling with other generators, paralleling control, over/undervoltage faults, remote metering and control, generator start-up control, output power calculation and display, reverse power fault, real power load sharing control during parallel operation, reactive power load sharing control during parallel operation, built-in self-diagnostics, and provision for external diagnostics equipment, just to name a few. Two common control functions are: (1) the regulation of the frequency of the generator output waveform typically performed by adjusting engine 24 operation; and, (2) the regulation of the excitation of the windings 32 of the generator 30, which affects the output voltage of the generator. To control these two functions, various control models can be incorporated into the operating logic of controller 72, including without limitation such control models as Proportional-Integral-Derivative (PID) controls, PI controls, fuzzy logic controls, and neural network controls. Further background concerning the application of this kind of approach for generator applications may be found in commonly owned U.S. Pat. Nos. 5,701,070 issued Dec. 23, 1997 and 5,006,781 issued Apr. 9, 1991, each of which are incorporated herein by reference in its entirety.

The system 20 includes, in certain embodiments, a remote device 82 that comprises some or all of the control instructions for the system 20. The remote device 82 communicates with the circuitry 70 over a communication path 84. The communication path 84 includes a network connection, a wireless communication, and/or an internet connection. The remote device 82 executes a portion or all of the instructions for controlling the system 20, and/or receives information from the circuitry 70 including a report of a shutdown condition.

Figure 2:
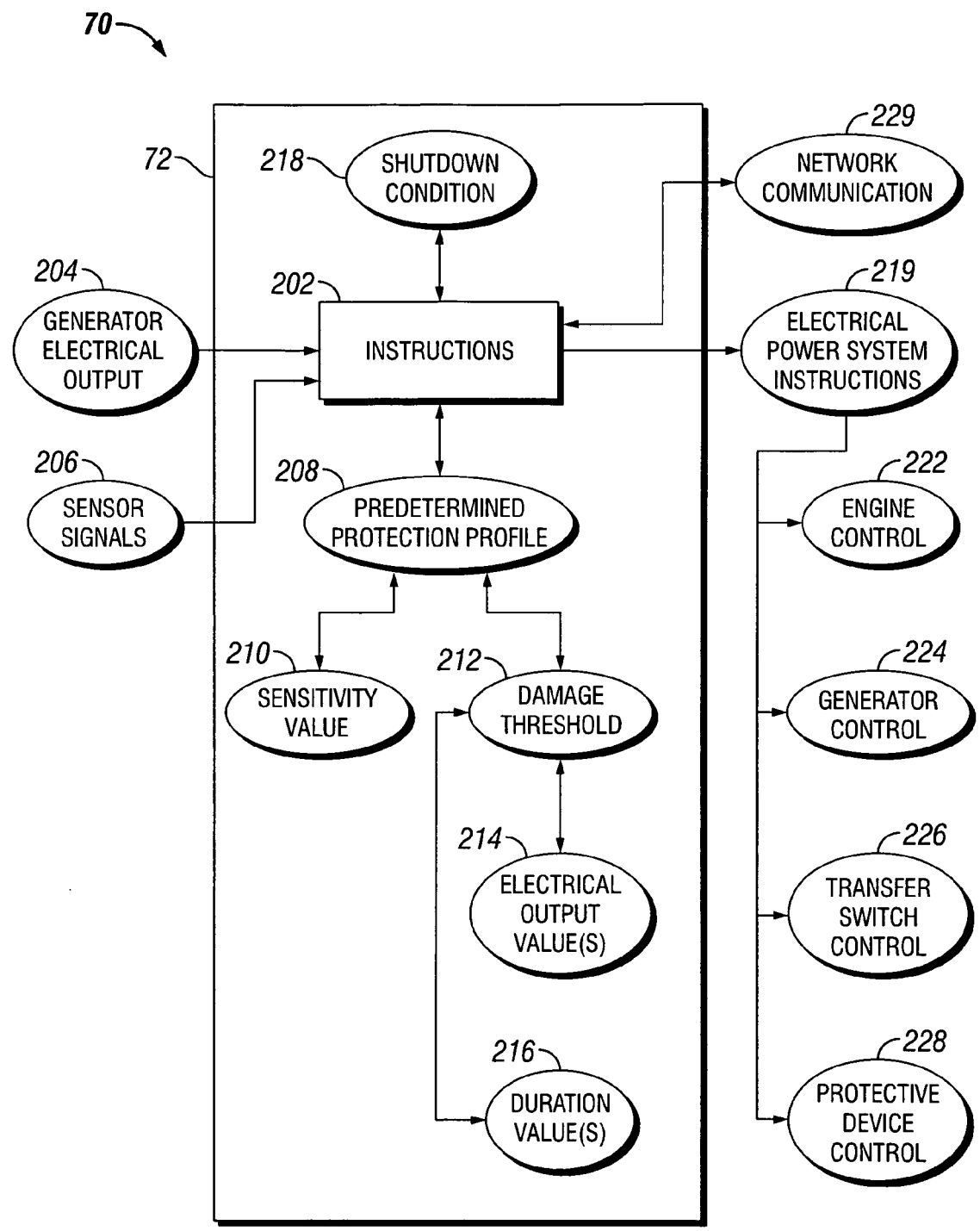
FIG. 2 is a schematic diagram of circuitry for controlling an electrical power system.

FIG. 2 is a schematic illustration of instructions 202 for performing control functions of the system 20. The instructions 202 are illustrated in relation to the controller 72, but a portion or all of the instructions 202 may be on one or more controllers 72, and/or on the remote device 82. In certain embodiments, the instructions 202 structure the circuitry 70 to determine if a shutdown condition 218 exists in response to a sensitivity value 210 and a sensor signal 206, where determining whether the shutdown condition 218 exists is a function of a predetermined protection profile 208. The circuitry 70 is shown including a predetermined protection profile 208, but the circuitry 70 alternatively or additionally includes a protection profile, and the circuitry 70 alternatively or additionally receives the predetermined protection profile 208 or protection profile, in whole or part, from a look up table, data storage device, remote database, and/or a network or internet source 82.

The instructions 202 further structure the circuitry 70 to provide a generator control instruction 224 halting the generator in response to the shutdown condition 218. In certain embodiments, the instructions 202 further structure the circuitry 70 to provide a generator control instruction 224 halting the generator in response to a shutdown condition 218 comprising a neutral electrical current, a ground electrical current, and/or a predicted profile value exceeding a predetermined threshold in relation to the sensitivity value 210.

For example, the sensor signal 206 indicates a ground electrical current having a higher value than a predetermined threshold defined by the sensitivity value 210, and the circuitry provides electrical power system instructions 219 including a generator control instruction 224 to halt operation of the generator. In another example, the circuitry 70 determines a predicted profile which is a future estimate of an electrical parameter based on present conditions in the system 20, and determines whether the predicted profile value exceeds a predetermined threshold related to the sensitivity value 210.

In certain embodiments, the instructions 202 structure the circuitry 70 to provide electrical switching equipment instructions (e.g. transfer switch control 226 commands) to route electricity from a power source 46 to the load 50 in response to the shutdown condition 218. The electrical switching equipment includes the transfer switch 40, the protective device(s) 76, and/or other equipment structured to route electrical power from the source(s) 30, 46 to the load(s) 50, 78. The circuitry 70 is structured to provide network communications 229 to report a shutdown condition 218 and/or to receive data, profile information, and/or at least a portion of the instructions 202.

The circuitry 70 is structured to receive generator electrical output information 204 and sensor signals 206, and to determine a shutdown condition 218 according to the received information 204, 206 and a predetermined protection profile 208. The predetermined protection profile 208 includes, in certain embodiments, a damage threshold 212 including an electrical output value 214 and a corresponding duration value 216. The damage threshold 212 can include a plurality of electrical output values 214 corresponding to a plurality of duration values 216. In certain embodiments, the damage threshold 212 includes a range of duration values 216 as a function of electrical output values 214, and/or a range of electrical output values 214 as a function of duration values. The damage threshold 212 comprises a portion or all of the predetermined protection profile 208 or a protection profile. The circuitry 70 provides electrical power system instructions 219 that include engine control instructions 222, generator control instructions 224, transfer switch control instructions 226, and/or protective device control instructions 228.

Various non-limiting examples of circuitry 70 operations are contemplated herein. In one example, the load 50 includes an induction motor, and the circuitry 70 monitors the generator 30 for compliance with a design voltage and frequency of the induction motor, disconnecting the generator 30 from the induction motor with the transfer switch 40 when the voltage or frequency is too high or too low for the induction motor. In another example, the load 50 includes a coil and/or a starter motor, and the circuitry 70 monitors the generator 30 for compliance with a design voltage, disconnecting the generator 30 from the coil and/or starter motor when the voltage is too high or low for the coil and/or starter motor. In yet another example, the load 50 includes incandescent lighting, and the circuitry 70 monitors the generator 30 for compliance with a design voltage and for compliance with a minimum frequency threshold, where the design voltage allows a greater percentage variation on the low voltage side, disconnecting the generator 30 from the incandescent lighting when the voltage is too high or too low, or when the frequency is too low, for the incandescent lighting.

In yet another example, the load 50 includes fluorescent lighting, and the circuitry 70 monitors the generator 30 for compliance with a design voltage, disconnecting the generator 30 from the fluorescent lighting when the voltage is too high or too low. In yet another example, the load 50 includes a high-intensity discharge lamp, and the circuitry 70 monitors the generator 30 for compliance with a design voltage, where the design voltage allows a greater percentage variation on the low voltage side, disconnecting the generator 30 from the high-intensity discharge lamp when the voltage is too high or too low. In yet another example, the load 50 includes a static uninterruptible power supply (UPS), and the circuitry 70 monitors the generator 30 for compliance with a design voltage, frequency, and frequency rate of change with time (slew rate), disconnecting the generator 30 from the UPS when the voltage is too high or too low, when the frequency is too high or too low, and/or when the frequency slew rate is too high. In yet another example, the load 50 includes a variable frequency drive (VFD), and the circuitry 70 monitors the generator 30 for compliance with a design voltage, frequency, and frequency rate of change with time (slew rate), disconnecting the generator 30 from the VFD when the voltage is too high or too low, when the frequency is too high or too low, and/or when the frequency slew rate is too high.

Figure 3:
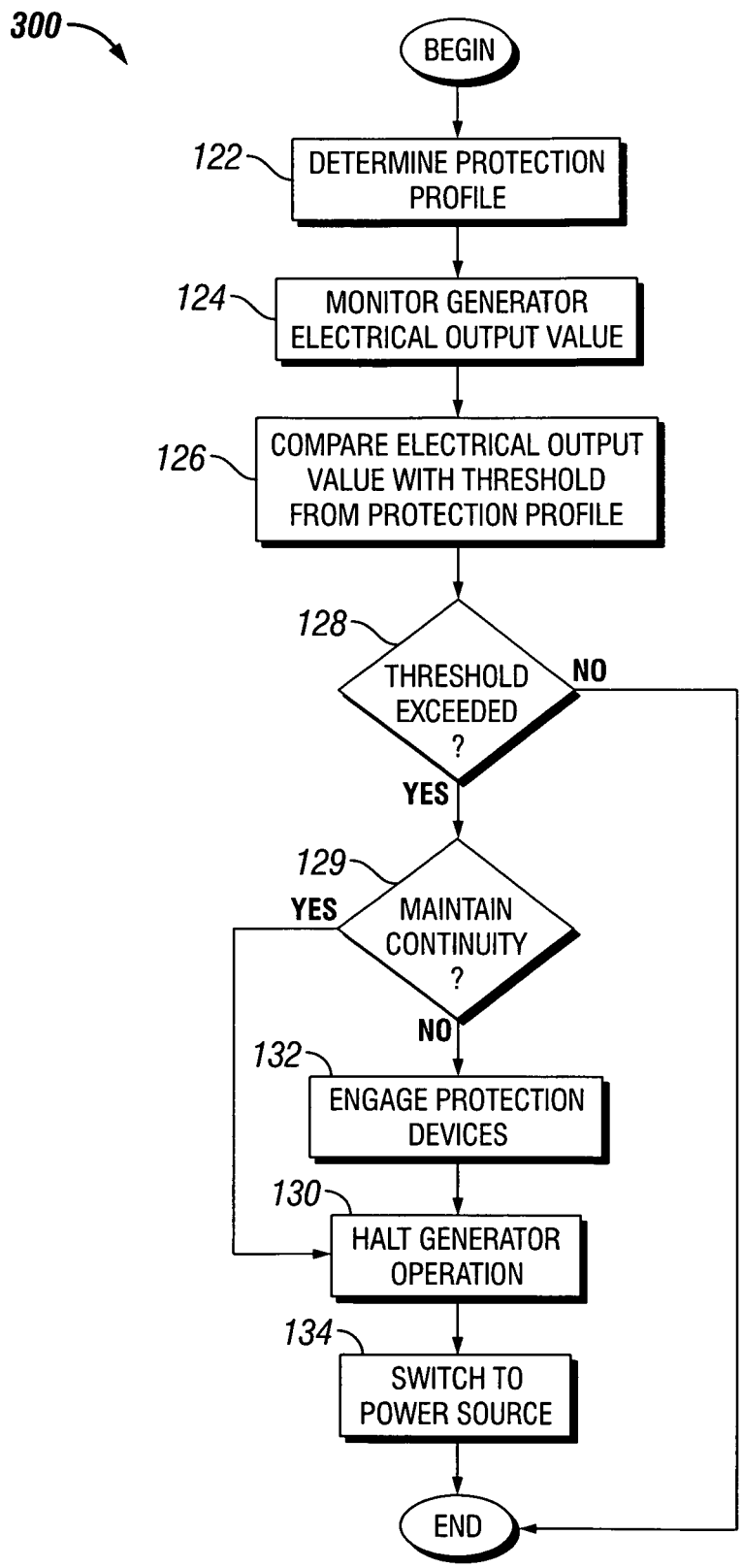
FIG. 3 is a flowchart of a procedure for operating the system of FIG. 1.

FIG. 3 illustrates control procedure 300 in flowchart form. Procedure 300 is executed with circuitry 70 and is embodied in the operating logic executed by controller 72. Procedure 300 starts with operation 122, which includes determining and selecting a protection profile to reference in later operations. The protection profile, in one or more embodiments, is in the form of a protection curve(s) defined in terms of time versus per unit output such as voltage, current, ground fault current, neutral current, harmonic distortion or temperature. The protection profile(s) are established to protect various components of electrical power system 20 from damage and may be initially determined with controller 72 and/or stored in memory 74 as data that is accessed by controller 72. This data can be provided in one or more forms, such as tables, schedules, databases, mathematical functions/definitions, and/or numerical relationships, to name a few. Surprisingly, it has been found that this type of profile can be used in lieu of electro-mechanical circuit breakers between generator 30 and transfer switch 40. Further, it has been found that assessing the operation of an electric power system in relation to a predetermined profile such as this type of profile, provides for accurate predictive operation such that an electric power system that may be devoid of electro-mechanical circuit breakers between generator 30 and transfer switch 40 can be accommodated. From a government regulatory and industry standards perspective, this fully electronic integrated approach is often technically superior to current practice and acceptable for many applications.

From FIG. 3, procedure 300 advances from operation 122 to operation 124. Operation 124 includes monitoring the electrical output values of generator 30 with sensors 62, 64, and 68. Operation 124 may further include monitoring of sensor 66 output as representative of the frequency of the generator electrical output, deriving such output frequency from sensors 62 and/or 64, and/or using different techniques. From operation 124, procedure 300 continues with operation 126 in which the electrical output from generator, or rate of change of the output 30 as measured with sensors 62 and 64 is compared with a threshold from the protection profile. From operation 126, procedure 300 continues with conditional 128. Conditional 128 tests whether the corresponding threshold defined by the protection profile has been or will be exceeded. If the test of conditional 128 is true (yes), then conditional 129 is reached. In conditional 129, circuitry 70 checks whether continuity between generator 30 and transfer switch 40 is to be maintained when the generator 30 operation is halted. If the test of conditional 129 is false (no), then operation 132 is reached. Operation 132 includes providing a discontinuity between the generator 30 and the transfer switch 40 with a protective device 76. Operation 132 may be performed by the circuitry 70 providing a protective device control instruction 228 to command the protective device 76 to provide a discontinuity between the generator 30 and the transfer switch 40. If the test of the conditional 129 is true (yes), or after the operation 132 is performed, the procedure 300 proceeds to operation 130 to halt operation of the generator 30.

The halting of the generator 30 can be implemented in a number of different ways. In one example, circuitry 70 sends an engine control signal 222 to engine 24 via output ENGCNTL to halt operation of engine 24 and correspondingly halt operation of generator 30. Alternatively or additionally, circuitry 70 sends a generator control signal 224 to halt excitation of windings 32 via output GENCNTL. The deactivation of generator 30 in accordance with the time requirements of the protection curve provides protection for not only generator 30, but also feeder or branch circuit conductors 34 and transfer switch 40 without need of a circuit breaker. Correspondingly, electrical continuity between generator 30 and transfer switch 40 is not disrupted by the protective action taken. However, it should be appreciated that in other embodiments, one or more circuit breakers, disconnect switches, electrically operated contactors or solid state switches may be present and may be tripped to provide further protection.

From operation 130, procedure 300 continues with operation 134 which provides for the selection of an alternate power source 46 if present. Operation 134 may be performed by the circuitry 70 providing a transfer switch control instruction 226 to command the transfer switch 40 to swap the power input from contacts 42 to contacts 44.

Figure 4:
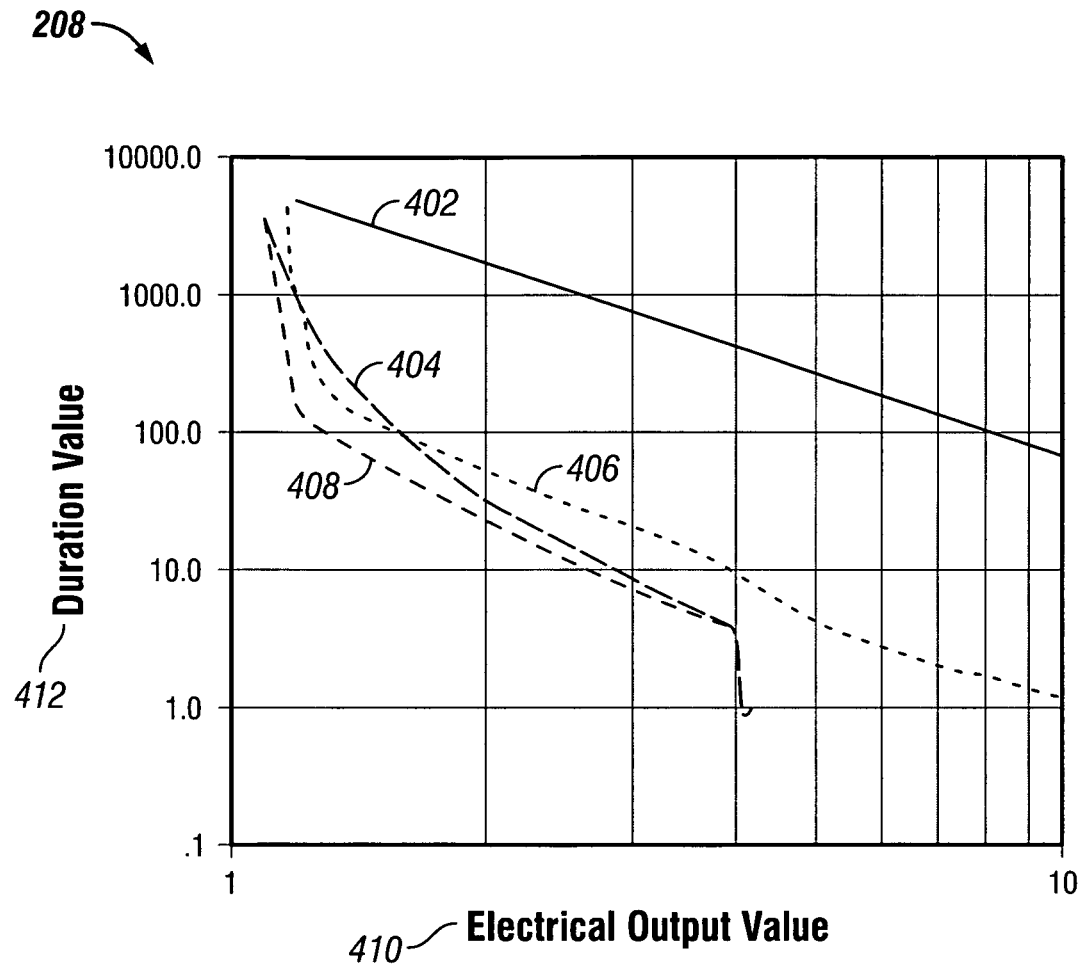
FIG. 4 is a graph illustrating an embodiment of a protection profile.

FIG. 4 graphically illustrates one example of a protection profile 208, being representative of an electrical output value 410 exposure for various devices as a function of duration values 412. The electrical output values 410 of FIG. 4 illustrate current values at various devices. In certain embodiments, the data for the protection profile 208 is determined from manufacturing data, from estimates of temperatures developed due to resistive heating, from sample data, from regulatory requirements, from industry standards, or through other electrical output limitation determinations understood in the art.

In certain embodiments, a curve 408 is positioned below or equal to the lowest curves 402, 404, 406 for other devices in the system 20, allowing the circuitry 70 to compare a single current value (e.g. the current from the generator 30 on the feeder or branch circuit conductors 34) to simplify the current protection. In other embodiments, the circuitry 70 may monitor individual currents at various devices, triggering current protection only when a current value at a device exceeds or is predicted to exceed the specific curve 402, 404, 406 for the device. In one example, curve 402 represents a current limitation for the feeder conductors 34, curve 404 represents a current limitation for the generator 30, and curve 406 represents a current limitation for the utilization equipment 78. Curves may be present for any device in the system 20, and may be based on any electrical output values including, without limitation, voltage deviation, power dissipation at the device, frequency deviation, frequency slew rate, harmonic distortion level, temperature, ground current flow, and/or neutral current flow.

Using the example of FIG. 4 with reference to the procedure of FIG. 3, whereby procedure 300 continues from operation 124 with operation 126 in which the electrical output from generator 30 as measured with sensors 62 and 64 is compared to the protection profile 208, the comparison involves both the total current magnitude 410 and the duration 412 indicated from the protection curve. Accordingly, this comparison includes recognizing current levels at or above the thresholds defined by the protection curve and timing a given level or rate of change as appropriate. From the example, the a current above about 4 units for about 1 second exceeds the curve 408 and at operation 128 the circuitry 70 makes a positive (yes) determination leading to operation 130 to halt generator operation.

Figure 5:
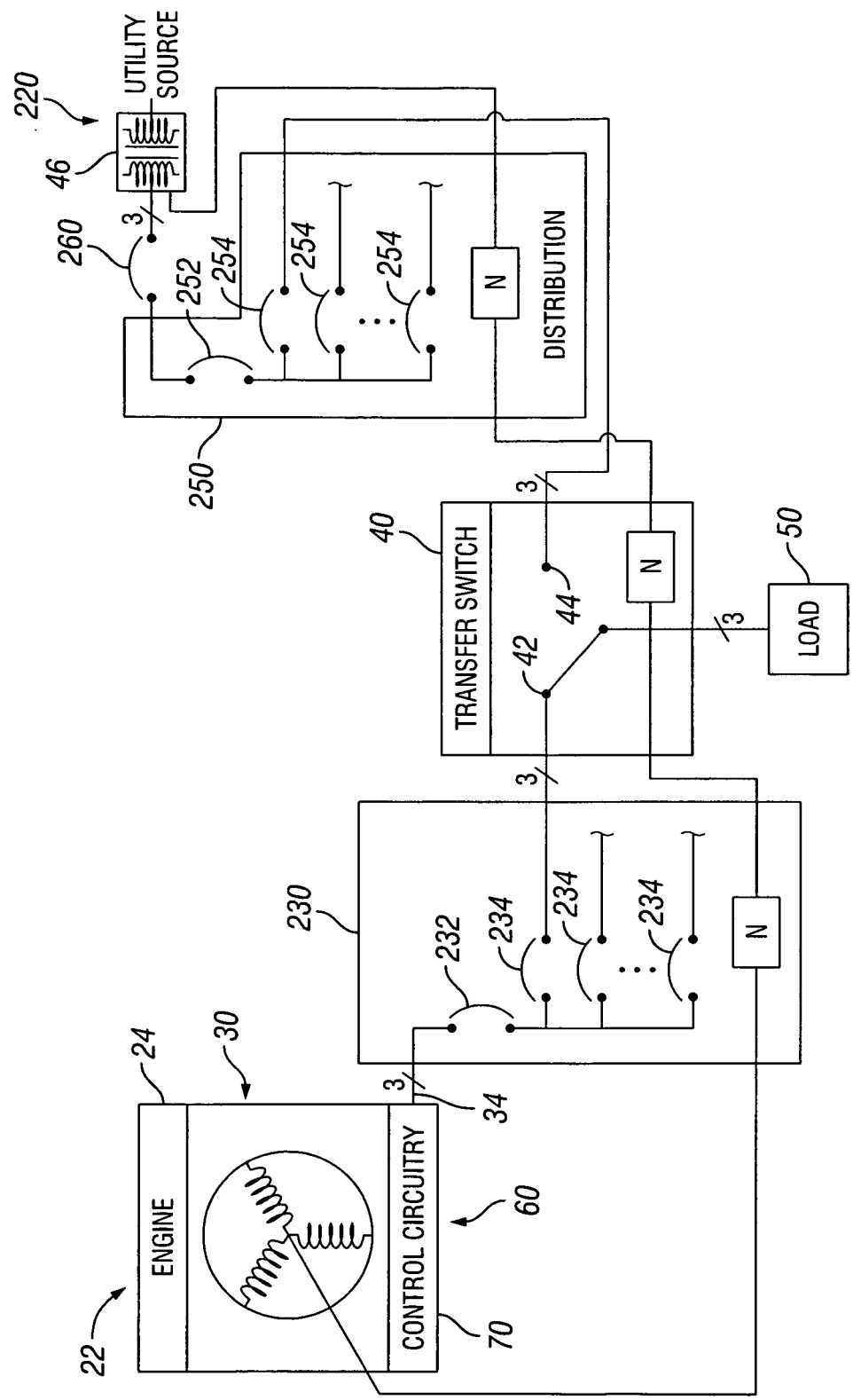
FIG. 5 is a diagrammatic view of another electrical power system.

FIG. 5 illustrates electrical system 220 of another embodiment of the present application; where like reference numerals refer to like features previously described. System 220 includes subsystem 22 with engine 24, generator 30, and circuitry 70. In system 220, subsystem 22 including feeder or branch circuit conductors 34 that are interconnected to transfer switch 40 through distribution panel equipment 230. Subsystem 22 also includes sensors 62, 64, 66, and 68 as previously described, which are not shown to preserve clarity. Equipment 230 includes main circuit breaker 232 and branch circuit breakers 234. One of branch breakers 234 is connected to contacts 42 of transfer switch 40 to route electric power from subsystem 22 to load 50 in a back-up capacity to power source 46. Correspondingly, power source 46 is coupled to contacts 44 by distribution panel equipment 250. Equipment 250 includes main circuit breaker 252 and branch circuit breakers 254, one of which being electrically connected to transfer switch 40 to selectively route electrical power thereto.

Procedure 300 of FIG. 3 may also be executed with system 220 as previously described. Equipment 230 and 250 include protective devices of the type subject to coordinated control in operation 132 in the event of a shutdown that deactivates generator 30. Such coordination may include opening the breaker 234 to disconnect contacts 42 from generator 30 and/or coordinating a change in state of transfer switch 40 and/or closure of breakers 254 connected to contacts 44.

Figure 6:
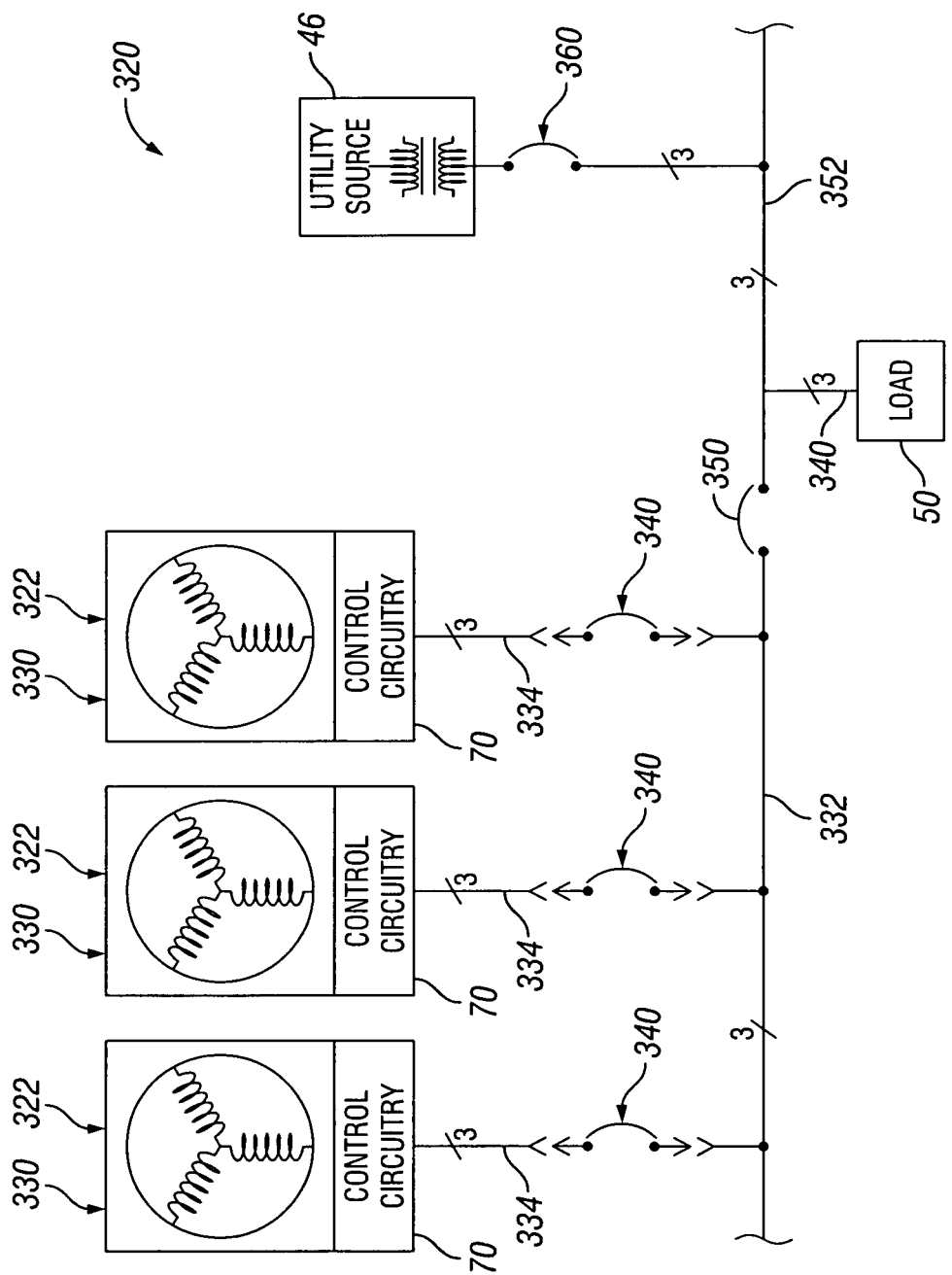
FIG. 6 is a diagrammatic view of yet a further electrical power system.

FIG. 6 illustrates electrical system 320 of a further embodiment of the present application; where like reference numerals refer to like features previously described. System 320 includes a number of electric power generation subsystems 322 each having electric output sensors of the type previously described (not shown), an engine or other prime mover (not shown), generator 330, and circuitry 70, respectively. Any of the generator 330 examples set forth in system 320 may be any of the types previously described, such as generator 30, or of a different type.

Subsystems 322 are arranged for selective parallel operation to provide a corresponding parallel power source 326. Source 326 is arranged to provide electrical power as an alternative to power source 46 and as such is understood to be considered a form of back-up arrangement. Source 326 also includes power bus 332, generator feeder conductors, 334, and power breaker/switches 340, respectively. Each generator 330 of system 320 can be connected and disconnected selectively to power bus 332 by corresponding feeder conductors 334 through a respective power breaker/switch 340. Source 326 is selectively connected to load 50 via load bus 352 by power breaker/switch 350 that is in turn connected to power bus 332. Alternatively, load 50 can be powered by power source 46 by the closure of power breaker/switch 360 connected to load bus 352.

In operation, for each subsystem 322 circuitry 70 monitors electric output of the respective generator 330 to determine if a shutdown condition in accordance with procedure 300 of FIG. 3 has occurred. If a shutdown condition occurs, then the corresponding generator 330 is deactivated. Further, in one or more embodiments, the engagement of protective devices per operation 132 typically includes opening the affected respective power breaker/switch 340 to disconnect the corresponding subsystem 322 from power bus 332. It will be understood by those skilled in the art that each respective power breaker/switch may be under the control of its respective circuitry. In this manner, each power generation subsystem 322 can be selectively placed in parallel operation with the other subsystems 322 as desired. Coordination may also include logic to assure that only one of switches 350 and 360 are closed at the same time and/or otherwise provide for the orderly transfer of load 50 (and bus 352) between the power sources 46 and 326. Such coordination may be embodied in only one or fewer of the respective circuitry 70 of subsystem 322, and/or reside in a master controller/circuit (not shown).

Figure 7:
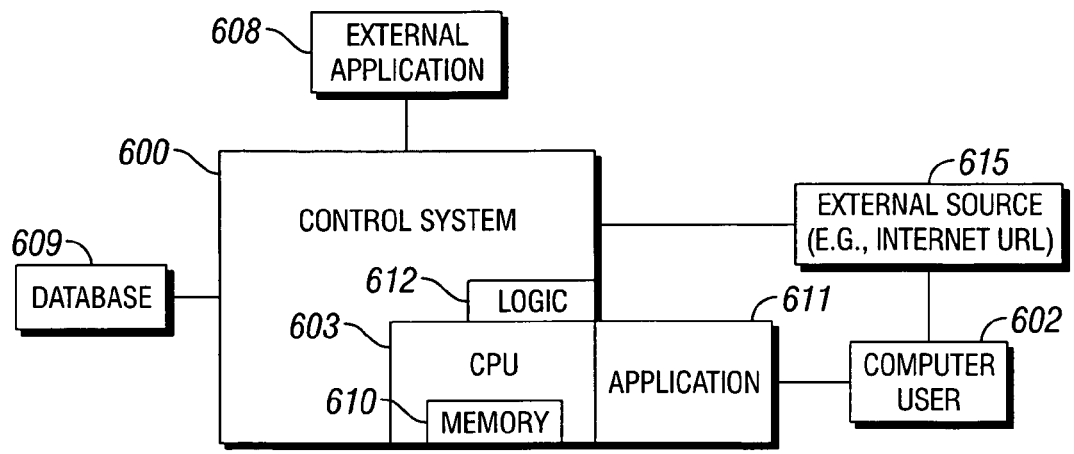
FIG. 7 is a diagrammatic view of a computer-based controller for an electrical power system.

FIG. 7 depicts a typical computer-based control system 600 comprising a computer user interface 602 in communication with a central processing unit (CPU) (i.e., microprocessor) at 603. Also at 603, the CPU is typically connected or in communication with internal memory, cache memory 610, and provides a capability to interface with a user through an application, program code or other software, 611, including an operating system. Data is accessible by the user and the user may input instructions to the system through the interface. The system operates in relation to received commands processed by the CPU which generates program control instructions to obtain data from the cache 610, access data storage devices or information at 604, control predetermined application events, or enable other application activity as instructed. Further, a control system may include a user or data management system being able to access or have instructions from applications apart from the system, such as those at 608, logic at 612, external source 615, and database access at 609. The database 609 may include historical data or data having profile information for one or components of an electric power system. As used herein the term control system includes data processing systems having one or more processors and their associated hardware and software, and systems including instantiable computer program product for performing predetermined activities of a data system having a centralized processing unit (CPU) and comprising a computer-readable storage medium having computer-readable program code portions stored therein, the computer-readable program code portions including executable portions of program instructions.

Figure 8:
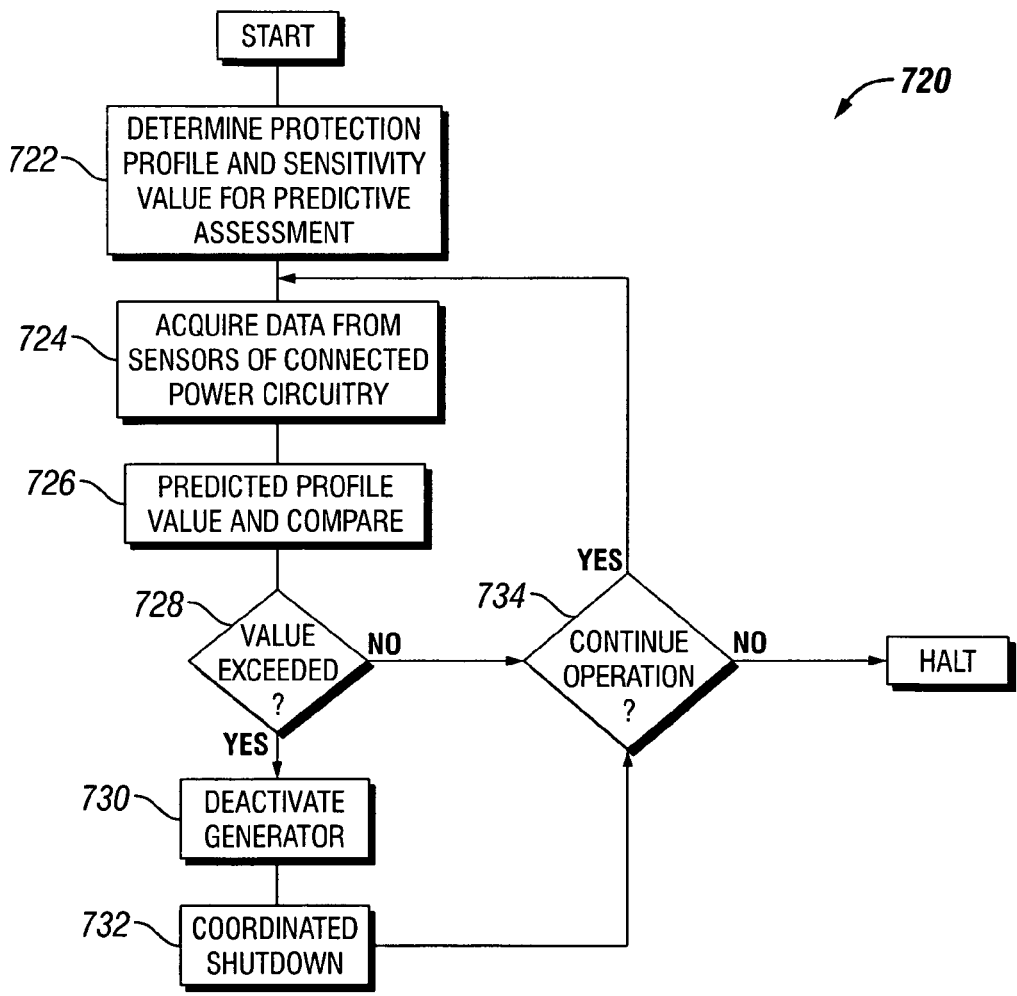
FIG. 8 is a flowchart of procedure process for predictively operating an electrical power system with a predictive control system.

FIG. 8 illustrates control procedure 720 for determining a predictive protection process in flowchart form. Procedure 720 is executed with a computer control system 600 and is embodied in the operating logic executed by the control logic 612. Procedure 720 starts with operation 722, which includes determining and selecting (either automatically in reference to one or more components of the electric power system, by example electrical power system 20 of FIG. 1, or manually from a user, by example user 602 of FIG. 6) a protection profile and sensitivity to reference in later operations for predictive determination. The protection profile, in one or more embodiments, is in the form of a protection curve or database tables being defined in terms of time versus per unit current.

The sensitivity value provides for an assessment of the present acquired operational characteristics in relation to recently acquired operational characteristics. For instance, the sensitivity value may be determined by a user, may be automatically determined, or may be a default value in relation to the components or operation of the electrical power system 20. By example, in one embodiment, the sensitivity value may be determined to be of a moderate level, where a predetermined number of previously obtained operational characteristics, such as the most recent three characteristic values, are to be included in the predictive assessment at 726.

The protection profile and sensitivity value are established to predictively protect various components of electrical power system 20 from damage and may be initially determined automatically or manually, and thereafter stored at one or more locations, such as in database 609, via memory 610, as data that is accessed by controller 600. This data can be provided in one or more forms, such as tables, schedules, databases, mathematical functions/definitions, and/or numerical relationships, to name a few. In one or more embodiments, a user 602 may download a predetermined profile from an external source 615, and store the predetermined profile in database 609.

Following selection of the protection profile, procedure 720 advances from operation 722 to operation 724. Operation 724 includes monitoring the AC electrical output of generator 30 with sensors 62 and 64, by example. Operation 724 may include monitoring of sensor 66 output as representative of the frequency of the generator electrical output, deriving such output frequency from sensors 62 and/or 64, and/or using different techniques. Data obtained from sensors is stored in a storage location in communication with the controller 600, such as the database 609. From operation 724, procedure 720 continues with operation 726 in which the electrical output from generator 30 as measured with sensors 62 and 64 is compared for predictive operation as to the protection profile selected at 722.

At operation 726, the recently acquired operational characteristics obtained from sensors at operation 724 are obtained from the storage location and are included with other previously (i.e., recently) obtained operational characteristics from earlier acquired data from sensors, preferably during a previous operation 724. A predicted profile value is determined at operation 726. The predicted profile value is of a value of a predictive arithmetic result determined in relation to the sensitivity value of operation 722. In one embodiment, for a moderate sensitivity value, the predicted profile value is a predetermined arithmetic operation resulting in the weighted average of the presently obtained sensor data from operation 724 and the prior three data values obtained from the three most recent operation 724 values, as a function of time (i.e., time interval), multiplied by an additional six percent. One of ordinary skill in the art will appreciate that the approach, formula, and implementation for determining a predictive arithmetic result is not limited to the examples set forth and may be in further relation to components, time, operational characteristics, electrical current, and safety approaches. Once determined, the predictive profile value is then compared to the data point of the selected profile of operation 722 corresponding to the next time interval.

From operation 726, procedure 720 continues with conditional 728. Conditional 728 tests whether the corresponding predicted profile value determined by operation 726 is likely to be exceed that of the corresponding time entry in the selected profile of operation 722. If the test of conditional 728 is true (yes), then operation 730 is reached. In operation 730, generator 30 is deactivated in advance of a condition reaching the selected profile in relation to the sensitivity value. The deactivation of generator 30 in advance of the time requirements of the protection curve provides protection for not only generator 30, but also feeder or branch circuit conductors 34 and transfer switch 40 without need of a circuit breaker. Correspondingly, electrical continuity between generator 30 and transfer switch 40 is not disrupted by the protective action taken. However, it should be appreciated that in other embodiments, one or more circuit breakers may be present and optionally may be tripped to provide protection.

From operation 730, procedure 720 continues with operation 732 which provides for the coordinated shutdown of other protection devices if present. From operation 732, conditional 734 is reached. Conditional 734 is also reached directly, bypassing operations 730 and 732, when the test of conditional 728 is negative (no). Conditional 734 tests whether to continue procedure 720. If the test of conditional 732 is affirmative (yes), then procedure 720 halts. If the test of conditional 734 is affirmative (yes), then procedure 720 returns to operation 724 to repeat operations 724 and 726, and conditional 728, and optionally operations 730 and 732 depending on conditional 728.

It should be understood that while three-phase, back-up electric power generation subsystems are shown in electrical power systems 20, 220, and 320; alternative arrangements of the present application may be of a different type, such as the single-phase electric power source variety and/or may be in the role of a primary source of power rather than as a back-up source. Furthermore, it should be appreciated that procedure 300 can be implemented with such alternatives with equal or greater effectiveness.

Figure 9:
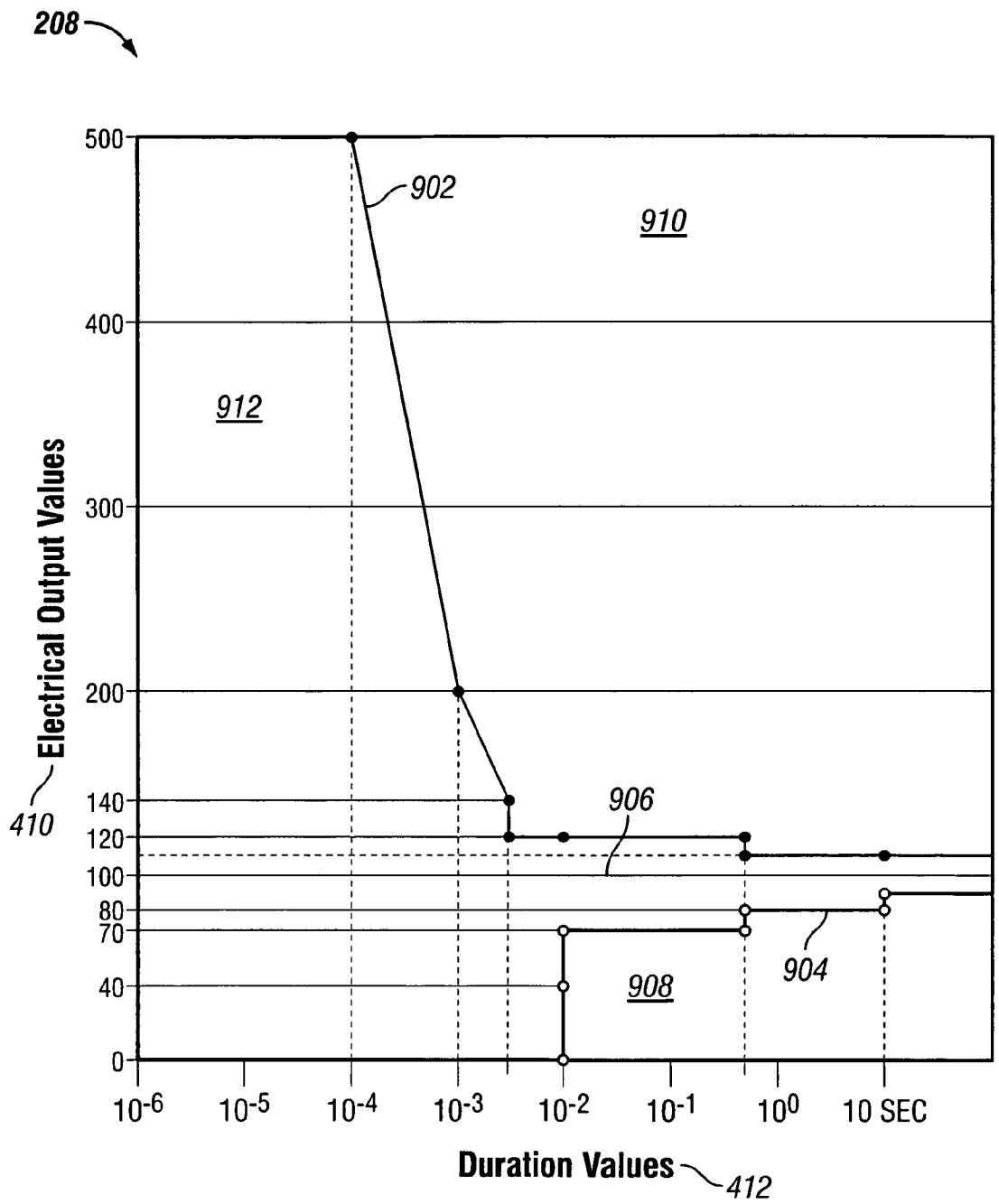
FIG. 9 is a graph illustrating an alternate embodiment of a protection profile.

FIG. 9 depicts an alternate embodiment of a protection profile 208. The protection profile 208 comprises electrical output values 410 as a function of duration values 412. A first curve 902 represents an over-voltage curve defining an over-voltage region 910, where voltage excursions into the over-voltage region 910 are determined at operation 128 to be a threshold exceedance initiating at operation 130 a halting of generator operation. A second curve 904 represents an under-voltage curve defining an under-voltage region 908 where voltage excursions into the under-voltage region 908 are determined at operation 128 to be a threshold exceedance initiating at operation 130 a halting of generator operation. The protection profile 208 is illustrative of a voltage profile for any electrical component in the system 20, including without limitation a voltage profile for a load 50. The voltage level 906 represents a nominal voltage, and the voltage region 912 represents an acceptable operation region. In the example of FIG. 9, it is seen that high voltages observed for periods lower than 104 seconds do not cause damage, and that low voltages observed for periods lower than 20-3 seconds do not cause damage.

Many further embodiments of the present application are envisioned. For example, in other embodiments a temperature sensor 68 is connected to circuitry 70 and its corresponding temperature sensor signal is used as a parameter with or without other input for comparison to a protection profile utilized in the procedure of FIG. 3. In still other examples, circuitry 70 is configured to include a number of different profiles for different equipment that can be manually or automatically determined. Thus, common control circuitry could be used for a number of different generators, feeder or branch circuit conductors, transfer switches, circuit breakers, disconnect switches, electrically operated contactors, solid state switches or loads.

One exemplary embodiment is a method including: operating an electrical power system including a generator and a transfer switch with a first input coupled to the generator by feeder or branch circuit conductors, and a second input coupled to a power source; providing electrical power to an electrical load from the generator through the transfer switch; monitoring an electrical output of the generator during the providing of the electrical power to the electrical load; and determining a shutdown condition in relation to a protection profile comprising a plurality of electrical output values each corresponding to one of a plurality of duration values, the protection profile representing a damage threshold for a power component.

The power component includes the generator, the feeder or branch circuit conductors, the transfer switch, utilization equipment, and/or the electrical load. The protection profile further includes a function relating a range of the electrical output values to a corresponding range of the duration values. In a further embodiment, the method includes halting operation of the generator in response to the shutdown condition. The method includes, in certain embodiments, maintaining electrical continuity of the feeder or branch circuit conductors to the generator and to the transfer switch during the halting of the generator. In a further embodiment, the electrical output values include electrical current values provided by the generator, where the protection profile is representative of an overcurrent protection curve, and where the power source is a utility power source.

The exemplary method further includes providing the electrical power with a neutral conductor, the monitoring of the electrical output further includes sensing a neutral electrical current through the neutral conductor and a ground electrical current through to an electrical ground of the generator, and the method further includes providing for a halting operation of the generator in response to the shutdown condition. In a further embodiment, the method includes stopping operation of the generator if at least one of the neutral electrical current and the ground electrical current exceeds a predetermined threshold.

The exemplary method includes configuring the transfer switch to route electricity from the power source to the electrical load in response to the shutdown condition, and halting operation of the generator in response to the shutdown condition. The method includes providing a protective device between the generator and the transfer switch and changing a state of the protective device to provide an electrical discontinuity between the generator and the transfer switch in response to the shutdown condition. The generator, in certain embodiments, includes a plurality of generators structured to operate in parallel to provide electricity to the transfer switch, where each of the multiple generators is selectively coupled to a common power bus by a circuit switch device. The power source provides power independent of the plurality of generators.

Another exemplary embodiment is a method including: operating an electrical power system including a power generation subsystem comprising a generator and generator control circuitry, and a transfer switch with a first input coupled to the generator by feeder or branch circuit conductors and a second input electrically coupled to a power source; supplying electrical power from the generator to the transfer switch; monitoring an electrical output of the generator during the supplying of the electrical power; determining a shutdown condition with the generator control circuitry; and ceasing operation of the generator in response to the shutdown condition while maintaining electrical continuity between the generator and the transfer switch.

In a further embodiment, the electrical output includes electrical current, and determining the shutdown condition includes comparing the electrical current to a predetermined protection profile for the electrical power system, the predetermined protection profile including electrical output values each corresponding to one of a number of duration value, where the predetermined protection profile represents a damage threshold for a power component including the generator, the feeder or branch circuit conductors, and/or the transfer switch. In certain embodiments, the electrical output values include overcurrent levels and the duration values include overcurrent durations. An exemplary embodiment includes determining of the shutdown condition by detecting a ground fault, an overvoltage condition, and/or an undervoltage condition.

The method further includes providing the electrical power with a neutral conductor, and monitoring of the electrical output further includes sensing a neutral electrical current through the neutral conductor and a ground electrical current through to an electrical ground of the generator. In a further embodiment, the method includes stopping operation of the generator the neutral electrical current and/or the ground electrical current exceeds a predetermined threshold. In certain embodiments, the method includes configuring the transfer switch to route electricity from the power source to the electrical load in response to the shutdown condition.

Yet another exemplary embodiment is an apparatus including an electric power generation system having a generator; generator control circuitry; electric output sensors each structured to provide a sensor signal to the generator control circuitry representative of an electric output of the generator; electrical switching equipment structured to selectively couple the generator to an electrical load; electric power feeder or branch circuit conductors electrically coupling the generator to the electrical switching equipment. The generator control circuitry is structured to: interpret an overcurrent protection profile, the overcurrent protection profile comprising a range of overcurrent level values corresponding to a range of overcurrent duration values for each of a number of power components, the power components comprising the generator, the feeder or branch circuit conductors, and/or the electrical switching equipment; and determine if a shutdown condition exists in response to sensor signal(s) and the overcurrent protection profile.

In a further embodiment, the generator control circuitry is further structured to generate an output signal in response to the shutdown condition, and the generator is structured to halt operation in response to the output signal. The apparatus includes an internal combustion engine mechanically coupled to the generator to provide rotary power thereto. The generator control circuitry includes means for regulating generator operation that is responsive to rotational speed of the engine. In certain embodiments, the generator is one of multiple generators coupled in parallel and each connected to a common power bus by a circuit switch, and the electrical switching equipment is a transfer switch that selects between the generator and another power source. The electrical switching equipment further includes a circuit switch.

The exemplary apparatus further includes means for protecting the electric power generation system in response to a ground fault, an overvoltage condition, and/or an undervoltage condition. The generator is coupled to a neutral conductor and further includes a first current sensor to detect electrical current flow through the neutral conductor and a second current sensor to detect electrical ground current. The electrical switching equipment includes a transfer switch that routes electricity from a utility power source to the electrical load in response to the shutdown condition.

Yet another exemplary embodiment is a control system operative with an electrical power system including a generator, generator control circuitry, at least one electric output sensor each structured to provide a sensor signal to the generator control circuitry representative of an electric output of the generator. The system includes electrical switching equipment structured to selectively couple the generator to an electrical load, and electric power feeder or branch circuit conductors, electrically coupling the generator to the electrical switching equipment. The electrical power system includes a centralized processing unit (CPU), an instantiable computer program product for protecting the electric power system, and a computer-readable storage medium having computer-readable program code portions stored therein, the computer-readable program code portions including a first executable portion having instructions being capable of: instructing operation of the electrical power system, controlling supply of electrical power to an electrical load from the generator through the electrical switching equipment, monitoring electrical output of the generator during supply of the electrical power to the electrical load, and determining a shutdown condition in relation to a predetermined protection profile.

In a further embodiment, the instructions are capable of: instructing control circuitry in response to a sensitivity value and at least one provided sensor signal to determine if a shutdown condition exists as a function of the predetermined protection profile. The instructions are further capable of instructing a halting of generator operation in response to the shutdown condition. In certain embodiments, the generator operation is halted if a neutral electrical current, a ground electrical current, and/or a predicted profile value exceeds a predetermined threshold in relation to the sensitivity value. The instructions are further capable of instructing the electrical switching equipment to route electricity from a utility power source to the electrical load in response to the shutdown condition. The electrical switching equipment can be a transfer switch.

In a further embodiment, the protection profile is determined as representing a damage threshold for the generator, the feeder or branch circuit conductors, and the electrical switching equipment at each of a number of different combinations of an electrical output value and a corresponding duration value for the electrical power system. The protection profile is selected from the protection profiles consisting of: an overcurrent protection profile, a modified overcurrent protection profile, a customized protection profile and one or more accessible protection profiles available for access, where the overcurrent protection profile is representative of an overcurrent damage threshold of the generator, the feeder or branch circuit conductors, and/or the electrical switching equipment for each of a number of different combinations of overcurrent level and overcurrent duration. The modified overcurrent protection profile is representative of an approximated overcurrent damage threshold of the generator, the feeder or branch circuit conductors, and/or the electrical switching equipment for each of a number of different combinations of overcurrent level and overcurrent duration. The customized overcurrent protection profile is representative of a calculated overcurrent damage threshold of the generator, the feeder or branch circuit conductors, and/or the electrical switching equipment for each of a number of different combinations of overcurrent level and overcurrent duration.

In certain embodiments, the accessible protection profiles are representative of a predetermined damage threshold of the generator for current, the feeder or branch circuit conductors, and the electrical switching equipment for each of a number of different combinations of a level of current in relation to a predetermined duration of time. The protection profile(s) are available from a look up table, a data storage device, a remote database, a network source, and/or an internet source. In certain embodiments, a protective device is provided between the generator and the transfer switch and the circuitry changes a state of the protective device to provide an electrical discontinuity between the generator and the transfer switch in response to the shutdown condition. The computer-readable program code portions can be executed remotely from the electrical power system and/or via a wireless network. In a further embodiment, the instructions are further capable of reporting a shutdown condition to a predetermined device in networked communication.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
    operating an electrical power system including a generator and a transfer switch with a first input coupled to the generator by conductors, and a second input coupled to a power source, wherein the conductors comprise one of feeder conductors and branch circuit conductors;
    providing electrical power to an electrical load from the generator through the transfer switch;
    monitoring an electrical output of the generator during the providing of the electrical power to the electrical load; and
    determining a shutdown condition in relation to a protection profile comprising a plurality of electrical output values each corresponding to one of a plurality of duration values, the protection profile representing a damage threshold for a plurality of power components.

2. The method of claim 1, wherein the protection profile further comprises a function relating a range of the electrical output values to a corresponding range of the duration values.

3. The method of claim 2, further comprising halting operation of the generator in response to the shutdown condition.

4. The method of claim 3, which includes maintaining electrical continuity of the conductors, to the generator and to the transfer switch during the halting of the generator.

5. The method of claim 2, wherein the electrical output values comprise electrical current values provided by the generator, wherein the protection profile is representative of an overcurrent protection curve, and wherein the power source is a utility power source.

6. The method of claim 1, wherein the plurality of power components comprises at least two electrical components selected from the electrical components consisting of the generator, the conductors, the transfer switch, utilization equipment, and the electrical load.

7. The method of claim 6, further comprising providing the electrical power with a neutral conductor, wherein monitoring of the electrical output further includes sensing a neutral electrical current through the neutral conductor and a ground electrical current through to an electrical ground of the generator, and the method further comprising providing for a halting operation of the generator in response to the shutdown condition.

8. The method of claim 7, further comprising stopping operation of the generator if at least one of the neutral electrical current and the ground electrical current exceeds a predetermined threshold.

9. The method of claim 6, further including configuring the transfer switch to route electricity from the power source to the electrical load in response to the shutdown condition.

10. The method of claim 9, further comprising halting operation of the generator in response to the shutdown condition.

11. The method of claim 2, further comprising providing a protective device between the generator and the transfer switch and changing a state of the protective device to provide an electrical discontinuity between the generator and the transfer switch in response to the shutdown condition.

12. The method of claim 2, wherein the generator is one of a plurality of generators structured to operate in parallel to provide electricity to the transfer switch, wherein each of the multiple generators is selectively coupled to a common power bus by a circuit switch device.

13. The method of claim 12, wherein the power source provides power independent of the plurality of generators.

14. A method, comprising:
operating an electrical power system including a power generation subsystem comprising a generator and generator control circuitry, and a transfer switch with a first input coupled to the generator by conductors, and a second input electrically coupled to a power source, wherein the conductors comprise one of feeder conductors and branch circuit conductors;
supplying electrical power from the generator to the transfer switch;
monitoring an electrical output of the generator during the supplying of the electrical power;
determining a shutdown condition with the generator control circuitry; and
ceasing operation of the generator in response to the shutdown condition while maintaining electrical continuity between the generator and the transfer switch.

15. The method of claim 14, wherein electrical output includes electrical current, and wherein determining the shutdown condition includes comparing the electrical current to a predetermined protection profile for the electrical power system, the predetermined protection profile comprising a plurality of electrical output values each corresponding to one of a plurality of duration values, the predetermined protection profile representing a damage threshold for a power component comprising at least one component selected from the components consisting of the generator, the conductors, and the transfer switch.

16. The method of claim 15, wherein the plurality of electrical output values comprise a plurality of overcurrent levels and the plurality of duration values comprises a plurality of overcurrent durations.

17. The method of claim 14, wherein the determining of the shutdown condition includes detecting at least one condition selected from the conditions consisting of: a ground fault, an overvoltage condition, and an undervoltage condition.

18. The method of claim 14, further comprising providing the electrical power with a neutral conductor, wherein monitoring of the electrical output further includes sensing a neutral electrical current through the neutral conductor and a ground electrical current through to an electrical ground of the generator.

19. The method of claim 18, further comprising stopping operation of the generator if at least one of the neutral electrical current and the ground electrical current exceeds a predetermined threshold.

20. The method of claim 14, further including configuring the transfer switch to route electricity from the power source to the electrical load in response to the shutdown condition.

21. An apparatus, comprising: an electric power generation system including:
a generator;
generator control circuitry;
at least one electric output sensor each structured to provide a sensor signal to the generator control circuitry representative of an electric output of the generator;
electrical switching equipment structured to selectively couple the generator to an electrical load;
electric power conductors electrically coupling the generator to the electrical switching equipment, wherein the conductors comprise one of feeder conductors and branch circuit conductors; and
the generator control circuitry structured to:
interpret an overcurrent protection profile, the overcurrent protection profile comprising a range of overcurrent level values corresponding to a range of overcurrent duration values for each of a plurality of power components, the power components comprising the generator, the conductors, and the electrical switching equipment; and
determine if a shutdown condition exists in response to at least one provided sensor signal and the overcurrent protection profile.

22. The apparatus of claim 21, wherein the generator control circuitry is further structured to generate an output signal in response to the shutdown condition, and wherein the generator is structured to halt operation in response to the output signal.

23. The apparatus of claim 22, further comprising an internal combustion engine mechanically coupled to the generator to provide rotary power thereto.

24. The apparatus of claim 23, wherein the generator control circuitry includes means for regulating generator operation that is responsive to rotational speed of the engine.

25. The apparatus of claim 21, wherein the generator is one of multiple generators coupled in parallel and each connected to a common power bus by a circuit switch and the electrical switching equipment is a transfer switch structured to select between the generator and another power source.

26. The apparatus of claim 21, wherein the electrical switching equipment includes a circuit switch.

27. The apparatus of claim 21, further comprising means for protecting the electric power generation system in response to one or more of a ground fault, an overvoltage condition, and an undervoltage condition.

28. The apparatus of claim 21, wherein the generator is coupled to a neutral conductor and further includes a first current sensor to detect electrical current flow through the neutral conductor and a second current sensor to detect electrical ground current.

29. The apparatus of claim 21, wherein the electrical switching equipment includes a transfer switch structured to route electricity from a utility power source to the electrical load in response to the shutdown condition.

30. A control system operative with an electrical power system including a generator, generator control circuitry, at least one electric output sensor each structured to provide a sensor signal to the generator control circuitry representative of an electric output of the generator, electrical switching equipment structured to selectively couple the generator to an electrical load, and electric power conductors comprising one of feeder conductors and branch circuit conductors, electrically coupling the generator to the electrical switching equipment, the electrical power system comprising a centralized processing unit (CPU), an instantiable computer program product for protecting the electric power system, and a computer-readable storage medium having computer-readable program code portions stored therein, the computer-readable program code portions including a first executable portion having instructions being capable of: instructing operation of the electrical power system, controlling supply of electrical power to an electrical load from the generator through the electrical switching equipment, monitoring electrical output of the generator during supply of the electrical power to the electrical load, and determining a shutdown condition in relation to a predetermined protection profile for each one of the generator, the electrical switching equipment, and the electrical power conductors.

31. The system of claim 30, wherein the instructions are further capable of: instructing control circuitry in response to a sensitivity value and at least one provided sensor signal to determine if a shutdown condition exists as a function of the predetermined protection profile.

32. The system of claim 31, wherein the instructions are further capable of: instructing a halting of generator operation in response to the shutdown condition.

33. The system of claim 32, wherein the generator operation is halted if at least one of a neutral electrical current, a ground electrical current, and a predicted profile value exceeds a predetermined threshold in relation to the sensitivity value.

34. The system of claim 33, wherein the instructions are further capable of: instructing the electrical switching equipment to route electricity from a utility power source to the electrical load in response to the shutdown condition.

35. The system of claim 34, wherein the electrical switching equipment is a transfer switch.

36. The system of claim 35, wherein the at least one protection profile is available from at least one of the sources consisting of a look up table, a data storage device, a remote database, a network source, and an interne source.

37. The system of claim 36, wherein the electrical switching equipment is a transfer switch.

38. The system of claim 37, wherein a protective device is provided between the generator and the transfer switch and further comprising changing state of the protective device to provide an electrical discontinuity between the generator and the transfer switch in response to the shutdown condition.

39. The system of claim 38, wherein the computer-readable program code portions are executed remotely from at least one of the electrical power system and via a wireless network.

40. The system of claim 38, wherein the instructions are further capable of: reporting a shutdown condition to a predetermined device in networked communication.

41. The system of claim 31, wherein the protection profile is determined as representing a damage threshold for the generator, the conductors, and the electrical switching equipment at each of a number of different combinations of an electrical output value and a corresponding duration value for the electrical power system and to be at least one protection profile selected from the protection profiles consisting of: an overcurrent protection profile, a modified overcurrent protection profile, a customized protection profile and one or more accessible protection profiles available for access; wherein the overcurrent protection profile is representative of an overcurrent damage threshold of the generator, the conductors, and the electrical switching equipment for each of a number of different combinations of overcurrent level and overcurrent duration; the modified overcurrent protection profile is representative of an approximated overcurrent damage threshold of the generator, the conductors, and the electrical switching equipment for each of a number of different combinations of overcurrent level and overcurrent duration; the customized overcurrent protection profile is representative of a calculated overcurrent damage threshold of the generator, the conductors, and the electrical switching equipment for each of a number of different combinations of overcurrent level and overcurrent duration; and the one or more accessible protection profiles is representative of a predetermined damage threshold of the generator for current, the feeder conductors, and the electrical switching equipment for each of a number of different combinations of a level of current in relation to a predetermined duration of time.

* * * * *